US009752755B2

(12) United States Patent
Mossdorf

(10) Patent No.: US 9,752,755 B2
(45) Date of Patent: Sep. 5, 2017

(54) COLLAPSIBLE REFLECTOR

(71) Applicant: Torben Christopher Mossdorf, Hamburg (DE)

(72) Inventor: Torben Christopher Mossdorf, Hamburg (DE)

(*) Notice: Subject to any disclaimer, the term of this patent is extended or adjusted under 35 U.S.C. 154(b) by 35 days.

(21) Appl. No.: 15/055,602

(22) Filed: Feb. 28, 2016

(65) Prior Publication Data

US 2016/0258595 A1   Sep. 8, 2016

(30) Foreign Application Priority Data

Mar. 7, 2015  (DE) .................. 10 2015 002 803
Sep. 17, 2015  (DE) .................. 20 2015 104 936 U

(51) Int. Cl.

| G03B 35/00 | (2006.01) |
|---|---|
| F21V 7/18 | (2006.01) |
| G03B 15/06 | (2006.01) |
| F24J 2/12 | (2006.01) |
| F24J 2/36 | (2006.01) |
| G02B 26/08 | (2006.01) |
| H01Q 15/16 | (2006.01) |
| F21V 7/04 | (2006.01) |
| F21V 7/06 | (2006.01) |

(52) U.S. Cl.
CPC ............... *F21V 7/18* (2013.01); *F24J 2/125* (2013.01); *F24J 2/36* (2013.01); *G02B 26/0825* (2013.01); *G03B 15/06* (2013.01); *H01Q 15/161* (2013.01); *F21V 7/048* (2013.01); *F21V 7/06* (2013.01); *G03B 2215/0582* (2013.01)

(58) Field of Classification Search
CPC ............... F21V 7/18; F21V 7/048; F21V 7/06
USPC .................................. 362/16, 341, 346, 352
See application file for complete search history.

(56) References Cited

U.S. PATENT DOCUMENTS

| 1,813,102 A | 7/1931 | Vogel |
| 2,513,961 A * | 7/1950 | Ostrom .................... F21V 7/18 126/624 |
| 2,586,583 A | 2/1952 | Wagner |
| 2,806,134 A | 9/1957 | Tarcici |
| 3,286,259 A | 11/1966 | R et al. |

(Continued)

FOREIGN PATENT DOCUMENTS

| DE | 469116 | 12/1928 |
| DE | 6902480 U | 10/1969 |

(Continued)

*Primary Examiner* — Vip Patel
(74) *Attorney, Agent, or Firm* — Smartpat PLC

(57) ABSTRACT

A collapsible reflector includes a plurality of reflective blades which are rotatably arranged around a common axis. Each blade has a leading edge and a trailing edge. The blades are substantially flat and stacked above one another between a top blade and a bottom blade when the reflector is in a retracted position. The blades rotate and elastically bend to form an approximately dish-shaped arrangement when in an extended position. The leading edge of each blade is arranged below the trailing edge of the adjacent blade when the reflector is in the extended position. This includes the leading edge of the top blade, which is below the trailing edge of the bottom blade when the reflector is in the extended position. One blade may be fixedly connected to a central hub, enabling quick setup and disassembly of the reflector.

22 Claims, 8 Drawing Sheets

(56) References Cited

U.S. PATENT DOCUMENTS

| | | | |
|---|---|---|---|
| 6,206,551 B1 * | 3/2001 | Stubblefield, Jr. ...... | F21L 19/00 |
| | | | 362/283 |
| 7,014,329 B2 | 3/2006 | Claypool | |
| 7,423,609 B2 | 9/2008 | Sänkelä | |
| 2012/0326921 A1 | 12/2012 | Geen | |

FOREIGN PATENT DOCUMENTS

| | | |
|---|---|---|
| DE | 19618434 C1 | 11/1997 |
| GB | 2272331 A | 5/1994 |

* cited by examiner

COLLAPSIBLE REFLECTOR

TECHNICAL FIELD

The present disclosure relates to reflectors, and more particularly to collapsible reflectors that can be opened like a fan.

BACKGROUND

Parabolic reflectors are widely used in various applications, e.g. as light sources in film and photography. The relatively large size of parabolic reflectors makes it difficult to transport them. Various approaches have been suggested to collapse reflectors when not in use to reduce their size and make them easier to be transported.

Today, collapsible reflectors, especially those used in photography, are predominantly made of a reflective fabric skin which is arranged on an umbrella-type support structure. Umbrella-style reflectors have several disadvantages:
- Umbrella reflectors comprise a central rod which prevents a light source from being mounted in the central axis of the reflector.
- The central rod of an umbrella reflector limits how close the reflector can be placed to an object.
- Tensioning struts arranged near the center of the reflector prevent positioning a light source close to the bottom of the reflector.
- The housing of the light source must be entirely placed within the parabolic reflector and causes shadows.

Parabolic reflectors made of sectoral blades that can be rotated around a common axis and be opened like a fan have been suggested. Until now, such fan-type reflectors have been difficult to use and expensive to make.

SUMMARY

The present disclosure relates to a collapsible reflector which can be opened and closed in a seamless motion like a fan. The reflector can be easily extended from a retracted position into an extended position and collapsed from the extended position to the retracted position. A user can extend and contract the reflector by holding the center of the reflector with one hand and moving, with the other hand, an outer edge of a top or a bottom blade. The reflector may be used to reflect electromagnetic or acoustic waves, for example light, heat, radio signals, or sound. The reflector may in particular be used for lighting purposes in photography and film, for interior lighting, for the transmission and reception of radio signals, to collect solar energy, or to receive sounds.

The collapsible reflector uses a plurality of reflective blades rotatably arranged around a common axis. Depending on the intended use the reflective blades may be made of metal, e.g. when used to reflect radio waves, or made of plastic when used to reflect light. For use in photography applications the reflective blades may in particular be made of white plastic and/or coated with a white or silver coating. To reduce manufacturing cost, the reflector may be made of three different types of blades: A unique top or bottom blade, a plurality of identical odd number type blades and a plurality of identical even number type blades. Alternatively, all but the top blade or the bottom blade may be identical. It is also possible that all blades, including the top and bottom blade, are identical.

Each blade has a leading edge and a trailing edge along its radial extension. When the reflector is in its retracted position the blades are substantially flat and stacked above one another between a top blade and a bottom blade. When the reflector is extended the blades rotate about their common axis and elastically bend to form an approximately dish-shaped arrangement. The dish-shaped arrangement may approximate a rotationally symmetrical dish, cup or bowl and may have an approximately parabolic cross section. When extended, the leading edge of each blade is arranged below the trailing edge of the adjacent blade. This includes the top blade, the leading edge of which is arranged below the trailing edge of the bottom blade when the reflector is in the extended position.

When extended, the top blade and the bottom blade may be removably connected in the area of their radially outer ends by a fastener. More specifically, the top blade may be connected to the bottom blade by a quick-release fastener which is arranged proximal to the outer end of the leading edge of the top blade and the outer end of the trailing edge of the bottom blade. A suitable quick-release fastener may be a snap fastener comprising a male and female stud couple or use a clip and aperture arrangement.

Adjacent blades may be connected at their outer ends and rotation of adjacent blades relative to each other may be limited by the connection. More specifically, each blade may be connected to its adjacent blade by a clip which engages through apertures in the adjacent blades. At least one of the apertures may be a slot extending near an outer end of the blade. The clip can slide within the slot and the blades can rotate against each other until the clip reaches the end of the slot and prevents further rotation of the blades against each other. Advantageously, enabled by the use of clips and slots, the leading edges and/or the trailing edges of the reflective blades may be arranged on top of one another when the reflector is in the retracted position.

When extended, the collapsible reflector may comprise a central axial opening through which a receiver and/or transmitter may be reaching from behind into the dish-shaped reflector. In particular, when used in photography applications, a light source such as a flash head or an LED light may be positioned so as to extend into the dish-shaped reflector through the central axial opening. The larger body of the flash head may be behind the dish-shaped reflector and only the flash element itself may reach into the dish-shaped reflector, preventing undesirable shadows that are caused by systems in which the entire flash head is arranged on the reflective side of the dish-shaped reflector.

The blades may at their inner ends be connected to a central hub element. The central hub may be substantially cylindrical and coaxial with the common axis of the blades. The inner end of one or more blades may comprise at least one arm arranged around the common axis and the central hub. The inner ends of each blade may comprise two arms which are arranged around the common axis, one arm reaching clockwise and the other arm reaching counterclockwise around the central hub. The two arms may form an annular ring around the central hub. The inner ends of one or more blades thus partially or completely surround the central hub. One arm of the bottom blade may extend above an arm of the top blade when the reflector is in the retracted position. It should be understood that in a mirrored arrangement an arm of the top blade may extend below an arm of the bottom blade.

A locking pin may be used to prevent the reflector from collapsing inadvertently. The locking pin may engage through one or more apertures in one or more blades and through apertures in the central hub when the reflector is extended and thereby prevent any relative movement of the blades and the central hub. The locking pin may extend inwardly into the dish-shaped reflector and hold a center disc which is arranged at a distance from the bottom of the dish-shaped reflector. The locking pin may have an edged (non-round) cross sectional shape to prevent it from rotating within the apertures in the central hub and a receiving opening in the center disc. The locking pin may for example have a hexagonal cross section. This allows use of a single locking pin to hold the center disc by an eccentrically positioned receiving opening while maintaining a substantially central position of the center disc in the dish-shaped reflector.

As described, the collapsible reflector may comprise a central hub having a longitudinal axis and a plurality of elastic blades arranged around the central hub. Each blade may be connected at an inner end to the central hub. The reflector is collapsible from an extended position, in which the blades together extend 360° around the hub, to a retracted position, in which the blades are stacked above one another. When extended, the blades may elastically deform to create an approximately parabolic dish-shape. When retracted, the inner end of at least one blade may be arranged non-horizontally relative to radial planes around the longitudinal axis. That is, a leading side of the inner end may be axially shifted relative to a trailing side of the inner end.

At least one blade may be connected to the central hub by one or more annular elastic arms which may slide axially along the central hub when the reflector is extended or retracted. The annular elastic arms may comprise circumferentially extending slots and adjacent arms may be connected by clips which engage overlapping slots and limit rotation of adjacent arms relative to each other.

The central hub may be a hub sleeve comprising an upper hub sleeve member and a lower hub sleeve member. The upper and the lower hub sleeve members may be identical and firmly connected to one another during assembly to form a substantially cylindrical hub sleeve. The hub sleeve may be arranged coaxial with the common axis of the blades. The plurality of elastic blades may include a bottom blade having a first annular arm rigidly connected to an upper end of the hub sleeve and a second annular arm rigidly connected to a lower end of the hub sleeve.

Each blade of the reflector may have a leading edge and a trailing edge along its radial extension and an inner edge and an outer edge along its circumferential extension. The leading edge of each blade, including the topmost and bottommost blades, may be arranged below the trailing edge of an adjacent blade when the reflector is expanded.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
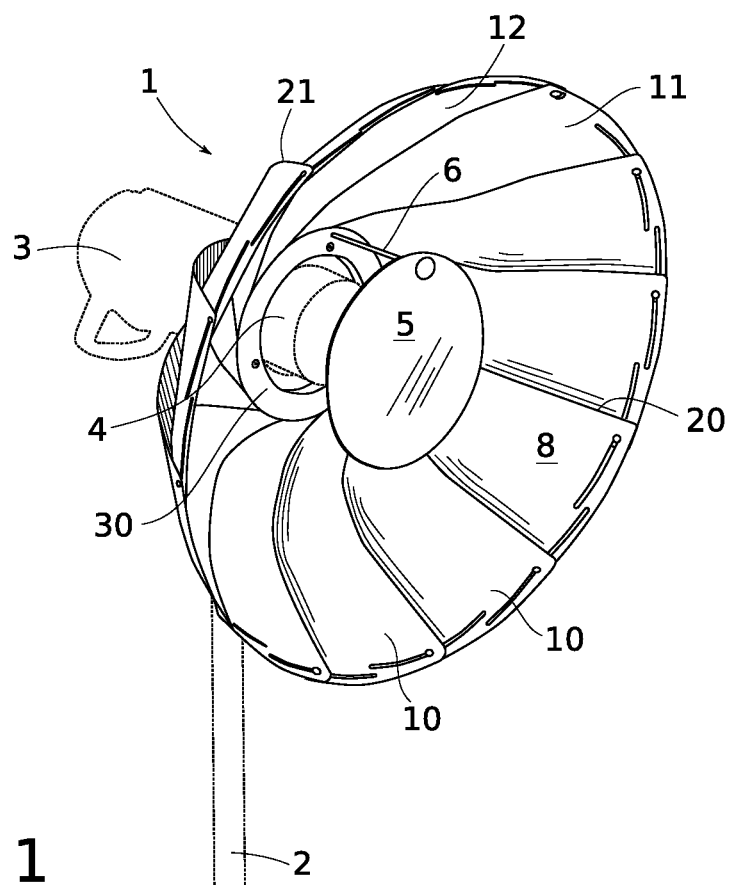
FIG. 1 is a perspective view of an exemplary collapsible reflector in an extended position while in use.
Figure 1:
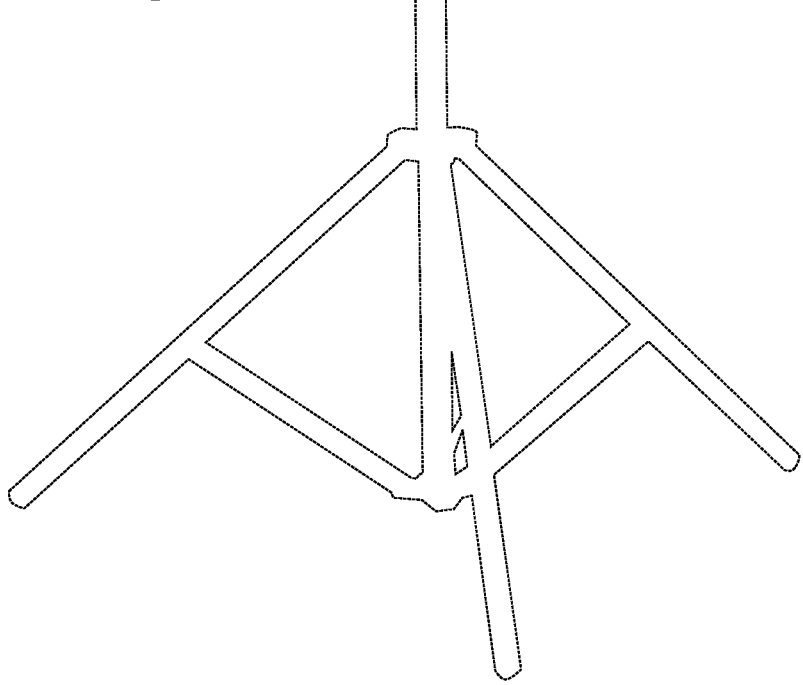

Referring to FIG. 1, a collapsible reflector 1 is shown in use. The collapsible reflector 1 is shown mounted onto a tripod stand 2. A total of twelve reflective blades 10 including a top blade 12 and a bottom blade 11 are arranged rotatably against each other around a common axis. Each blade has a leading edge 21 and a trailing edge 20. In the illustrated extended position the blades 10 rotate and elastically bend to form an approximately dish-shaped arrangement. The leading edge 21 of each blade 10 is arranged below the trailing edge 20 of the adjacent blade. This includes the leading edge 21 of the bottom blade 11 which is arranged below the trailing edge 20 of the top blade 12.

For clarity of description in this paper the terms "top" and "bottom", "above" and "below", and "upper" and "lower" refer to relative placement of elements of the reflector 1 when held in an exemplary orientation. As one skilled in the art will appreciate the reflector 1 may be randomly oriented so that the "bottom" blade 11 may in fact be facing sideways or upwardly when in use. Similarly, the terms "leading" and "trailing" refer to radially extending opposite edges of the blades and are interchangeable. The terms "leading" and "trailing" should be understood as "a first" and "a second".

A light source 3, e.g. a flash light, can be mounted to the reflector 1 through a central axial opening 4. A center disc 5 is arranged at a distance from the bottom of the dish-shaped reflector 1 by a single, eccentrically located, locking pin 6 which engages a receiving opening in the center disc 5.

The blades 10 are made of an elastically deformable material that is relatively thin and reflective. The blades may be between 0.2 mm and 3 mm thick. For use in lighting application, e.g. for photography or film where diffuse reflective characteristics are desired, the blades may be made of white or silver coated plastics. The blades may also be highly reflective e.g. when used in solar applications to collect solar energy. The blades may alternatively be made of metal for use in antenna applications.

Figure 2:
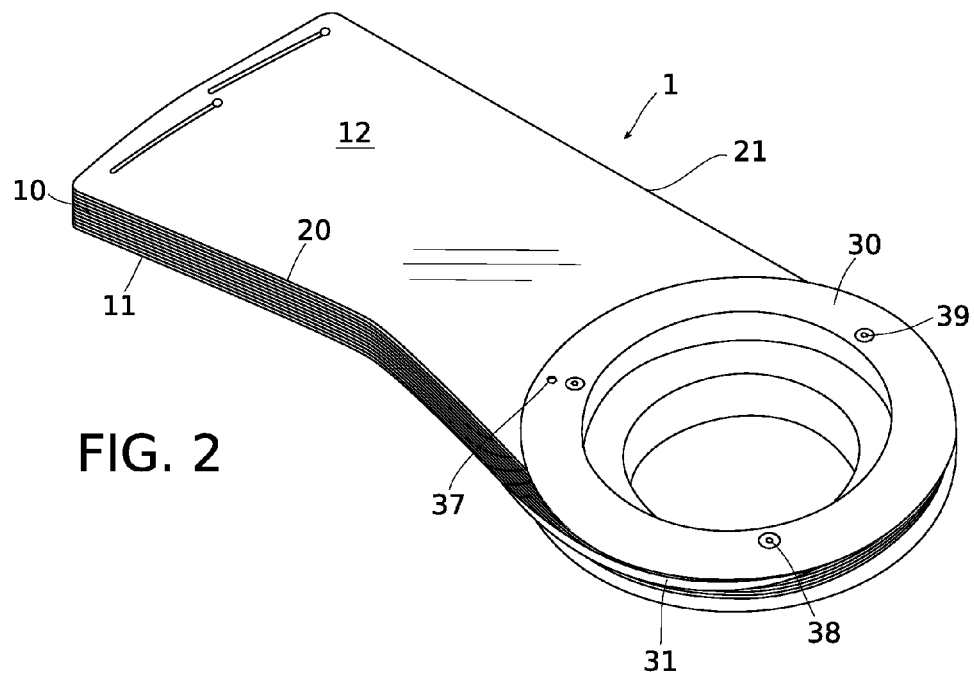
FIG. 2 is a perspective view of the reflector as in FIG. 1 in a retracted position.

FIG. 2 shows the reflector 1 in a retracted position. The reflective blades 10 are substantially flat and stacked above one another between a top blade 12 and a bottom blade 11. The leading edges 21 and the trailing edges 20 of the blades are stacked on top of one another. In the retracted position the reflector 1 assumes a compact form, making it easy to transport.

Figure 3:
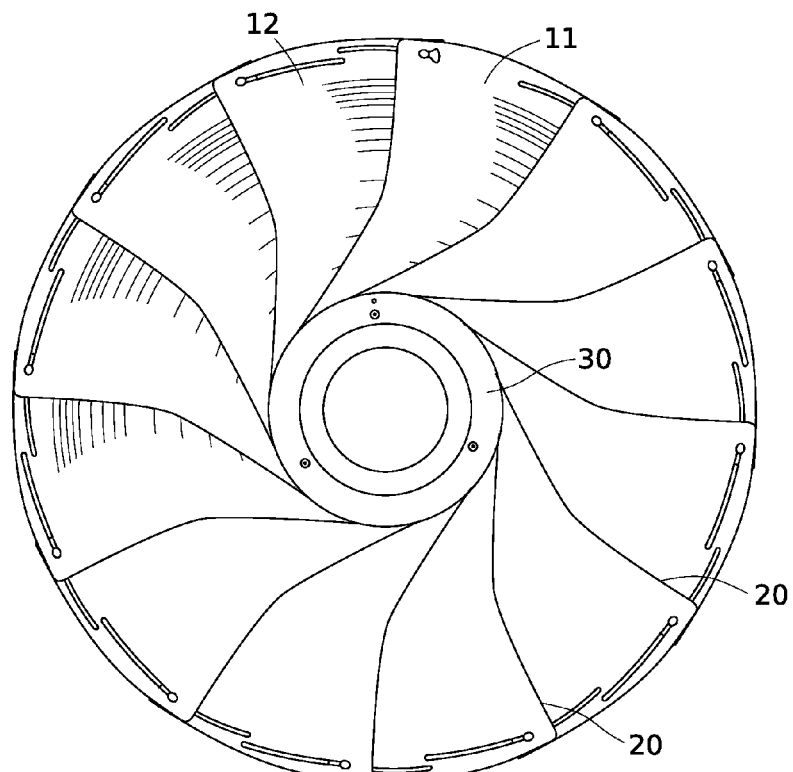
FIG. 3 is top view of the reflector as in FIG. 1 in the extended position.

FIG. 3 shows a top view of the reflector 1 in the extended state. Only trailing edges 20 can be seen in this view, as the leading edge 21 of every blade slides below the trailing edge 21 of the adjacent blade. In particular, the trailing edge 20 of the bottom blade 11 overlaps the leading edge 21 of the top blade 12. In a bottom view (not shown) only leading edges 21 of the blades 10, including the leading edges of the top blade 12 and the bottom blade 11, can be seen.

Figure 10:
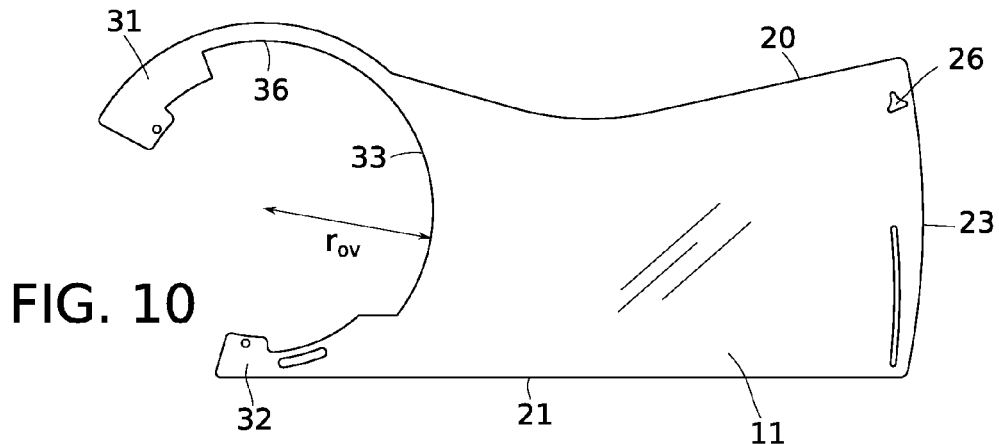
FIG. 10 is a top view of a bottom blade.
Figure 11:
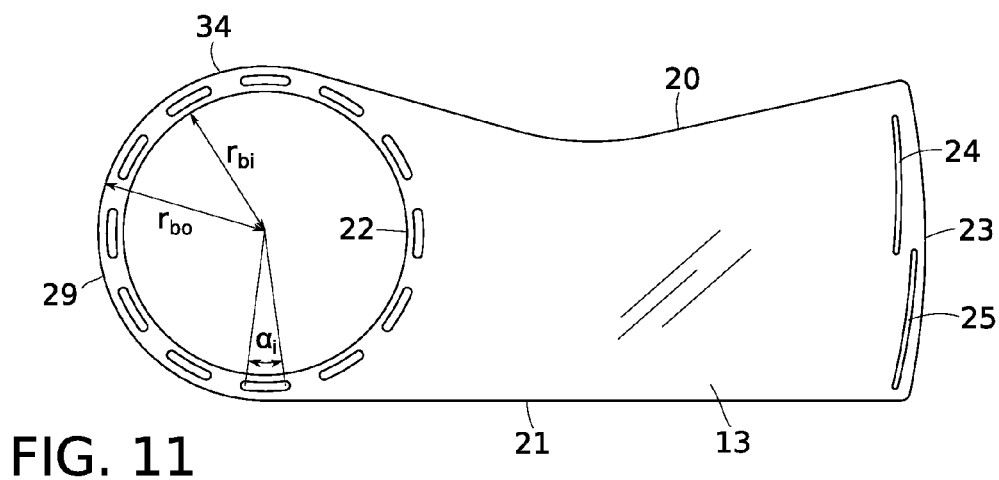
FIG. 11 is a top view of an even number blade.
Figure 12:
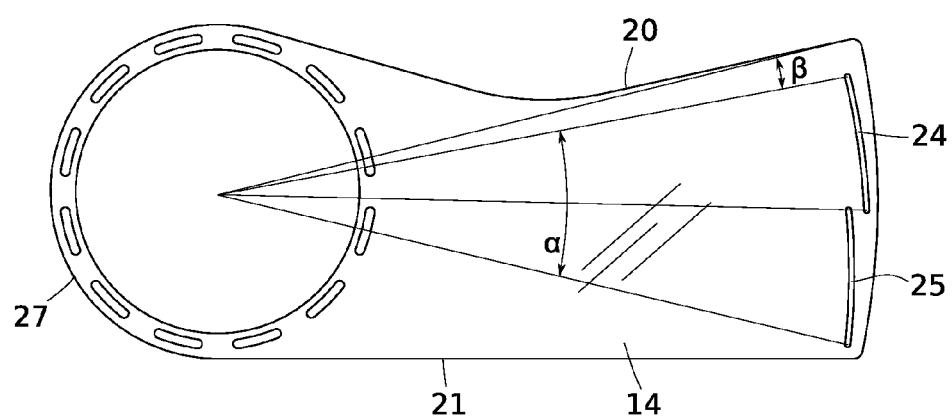
FIG. 12 is a top view of an odd number blade.
Figure 13:
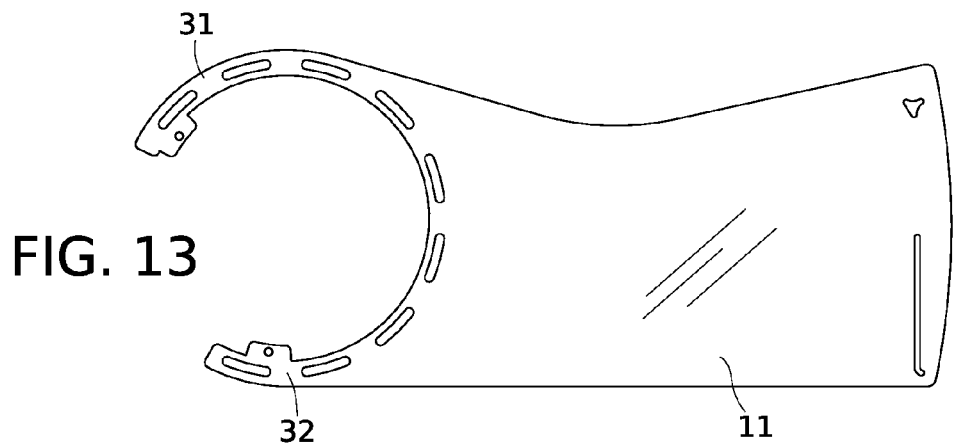
FIG. 13 is a top view of an alternative bottom blade.

FIGS. 10, 11, and 12 show the blades 10 which are used in the reflector 1. FIG. 10 shows the bottom blade 11. FIG. 11 shows an even number type blade 13 and FIG. 12 shows an odd number type blade 14. Each blade 11, 13, 14 has a radially extending leading edge 21 and a trailing edge 20. The blades extend radially from an inner end 22 to an outer end 23. A reflector 1 comprises one bottom blade 11. Stacked on top of the bottom blade 11 are alternatingly even number type blades 13 and odd number blades 14. An exemplary reflector may use twelve blades, including one bottom blade 11, six identical even number type blades 13 and five identical odd number type blades 14. When extended, each blade 10 of a twelve blade reflector 1 covers an angular range α of 360°/12=30° around the central axis of the reflector 1. Each blade 10 overlaps by an angle β with the adjacent blade. The overlap angle β is preferably selected to be much smaller than the coverage angle α and may e.g. be between 1° and 5°.

The shape of the trailing edge 20 is carefully selected to affect a desired tension within the reflector 1 and thus axial cross-sectional shape of the reflector 1 when the blades 10 elastically deform. The width of the blade 10 changes over its radial extension. The width of the blade gradually decreases between the inner end 22 and the outer end 23 toward a minimum width. The blade assumes its minimum width approximately centrally at half distance between the inner end 22 and the outer end 23. The varying width of the blade 10 corresponds to a bend in the trailing edge 20 of the blade. Towards the outer end 23 of the blade 10 the trailing edge 20 extends approximately radially towards the center axis around which the blade 10 rotates. Inwardly of the bend the trailing edge 20 extends towards a trailing arm of the blade 10.

Alternative reflectors may use more or fewer blades. In particular, beneficial proportions of the reflector when in the contracted state can be achieved by using a few as 5 blades and as many as 25 blades.

Adjacent blades 10 are connected at their outer ends 23 such that rotation of adjacent blades 10 relative to each other is limited by the connection. More specifically, the outer ends of two adjacent blades 10 may be connected to each other by an outer clip 40 which engages through apertures 24,25 in the adjacent blades 10. At least one of the apertures 24,25 may be a slot extending approximately circumferentially near the outer end 23 of the blade 10. As shown in FIGS. 11 and 12, the apertures may be a leading slot 25 and a trailing slot 24, each extending approximately circumferentially along an angular extension of approximately 0.5*α. The angular extension of both apertures, i.e. the sum of the angular extension of the leading aperture 25 and the trailing aperture 24 equals the coverage angle α of the blade 10 in the extended position.

Figure 8:
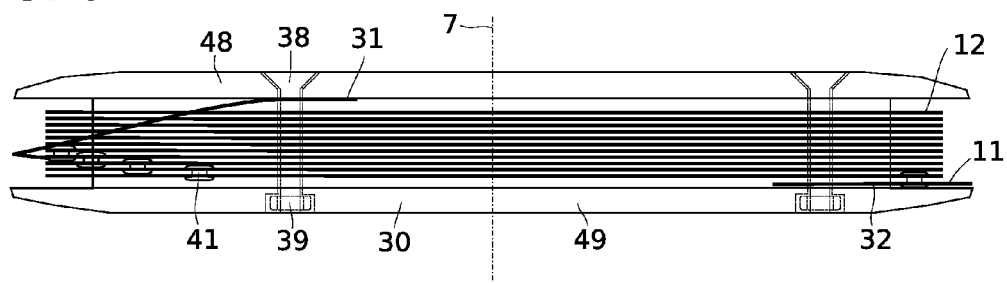
FIG. 8 is side view of the reflector as in FIG. 1 in the retracted position using the blades depicted in FIGS. 10-12.
Figure 14:
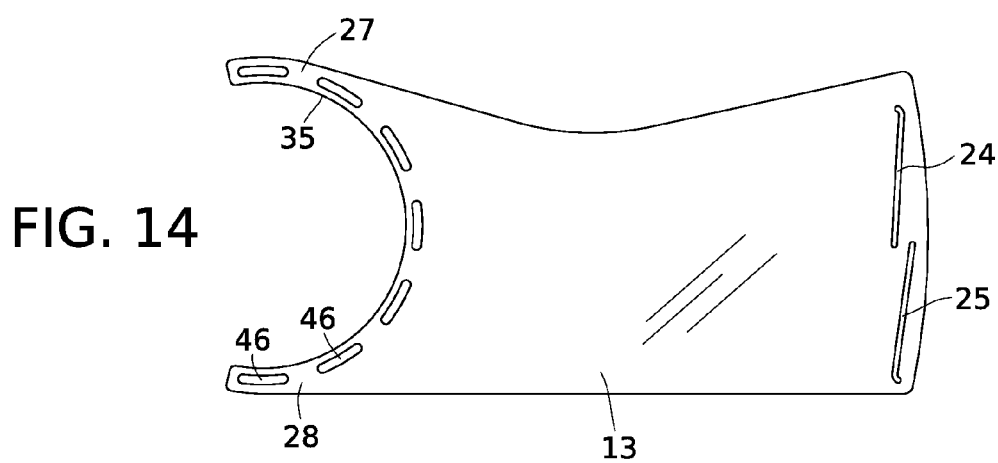
FIG. 14 is a top view of an alternative even number blade.
Figure 15:
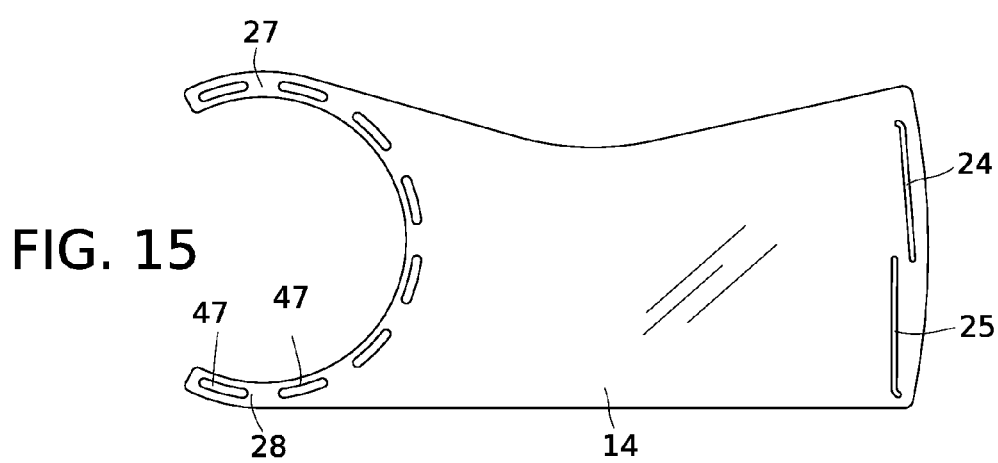
FIG. 15 is a top view of an alternative odd number blade.
Figure 16:
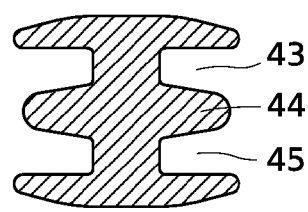
FIG. 16 is a sectional view of an outer clip.
Figure 17:
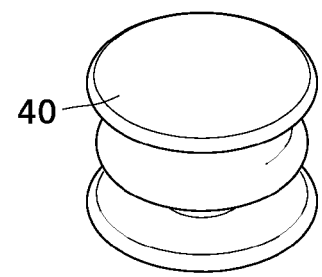
FIG. 17 is a perspective view of an outer clip.
Figure 18:
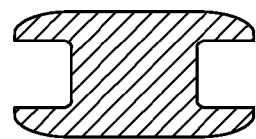
FIG. 18 is a sectional view of an inner clip.
Figure 19:
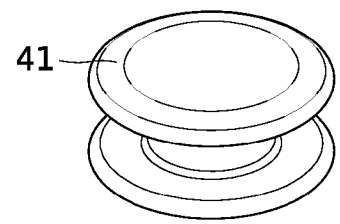
FIG. 19 is a perspective view of an inner clip.

At their inner ends 22 the blades 10 are connected to a central hub 30. The central hub 30 may be a substantially cylindrical hub sleeve and comprise two substantially cylindrical hub sleeve segments. The bottom blade 11 is connected to the central hub 30 by two arms, a leading arm 32 and a trailing arm 31. As shown in FIG. 8, the trailing arm 31 of the bottom blade 11 extends above the top blade 12 when the reflector is in the retracted position. The even number type blades 13 and the odd number type blades 14 are arranged coaxially with the bottom blade 11 rotatably around a common axis 7. As shown in FIGS. 14 and 15, the blades 13, 14 may use a leading arm 28 and a trailing arm 27 each to connect to the central hub 30. In that case, the arms 27, 28 have a circular inner edge 35 that extends more than 180° around the central hub 30. The radius $r_{bi}$ of the inner edge 33 is preferably just slightly larger than the radius $r_{ho}$ of the central hub sleeve so that the blades 10 can easily rotate about the central hub 30 but not move radially relative to the hub and each other. The blades 10 may however slide axially up- and downwardly along the hub sleeve 30 when the reflector 1 is extended or contracted. Alternatively, as shown in FIGS. 11 and 12, the even number type blades 13 and the odd number type blades 14 may have connected arms forming an annular attachment ring 29 that surrounds the hub sleeve of the central hub 30.

Figure 9:
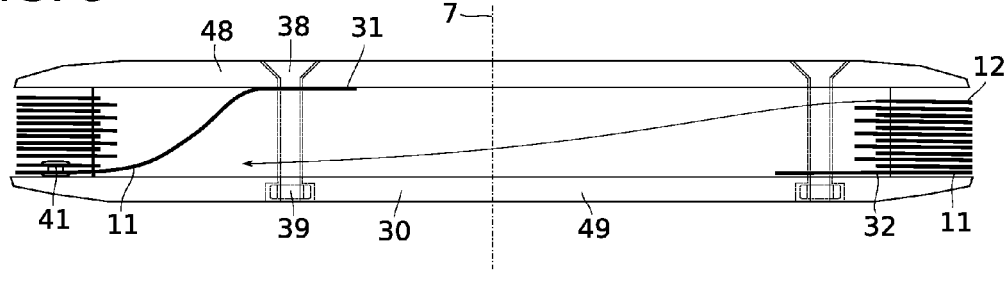
FIG. 9 is side view of the reflector as in FIG. 1 in the retracted position using the blades depicted in FIGS. 13-15.

The bottom blade 11 is attached to the central hub 30 with a leading arm 32 and a trailing arm 31. The leading arm 32 and/or the trailing arm 31 of the bottom blade 11 have an outwardly recessed overlap area 36. In the overlap area 36 the trailing arm 31 of the bottom blade 11 wraps radially outwardly around the arms 27,28,29 of the remaining blades 10. This allows the leading arm 32 of the bottom blade 11 to extend below and the trailing arm 31 of the bottom blade 11 to extend above the top blade 12 as shown in FIGS. 8 and 9. The radius $r_{ov}$ of the recessed inner edge 33 of the bottom blade 11 in the overlap area 36 is larger than the outer radius $r_{bo}$ of an outer edge 34 of the arms 27,28 of the blades 10, respectively the outer radius $r_{bo}$ of the annular attachment ring 29. The inner end 22 of the bottom blade 11 is arranged non-horizontally relative to radial planes around the longitudinal axis when the reflector is in the retracted position. That is, the inner end 22 of the bottom blade 11 is axially shifted with the leading arm 32 being axially below the trailing arm 31.

Figure 4:
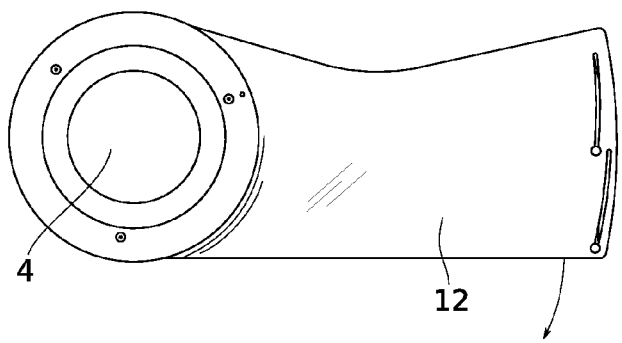
FIG. 4 is top view of the reflector as in FIG. 1 in the retracted position.
Figure 5:
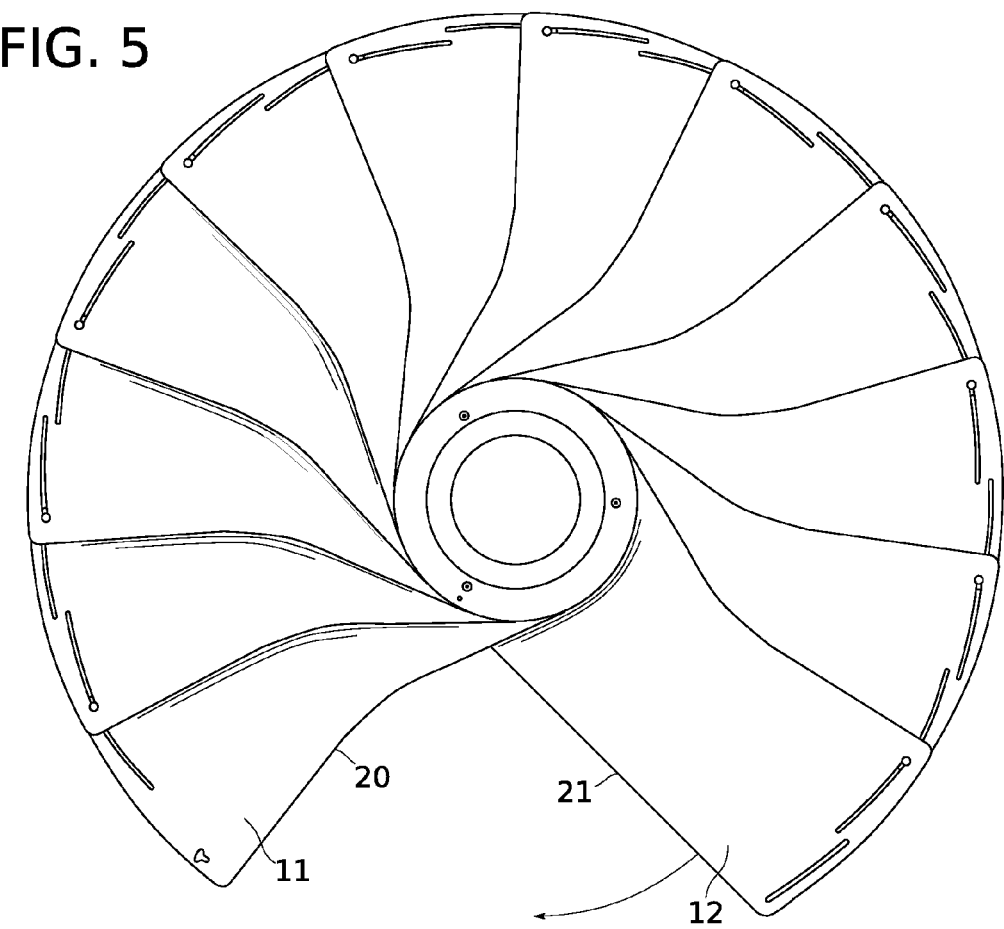
FIG. 5 is a top view of the reflector as in FIG. 1 in a partially extended position while transitioning from the retracted position to the extended position.
Figure 6:
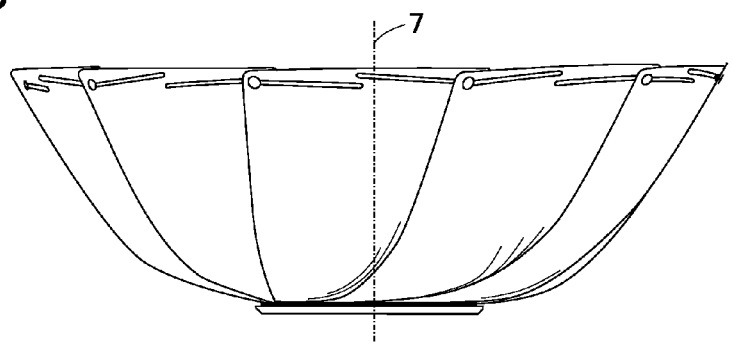
FIG. 6 is side view of the reflector as in FIG. 1 in the extended position.
Figure 7:
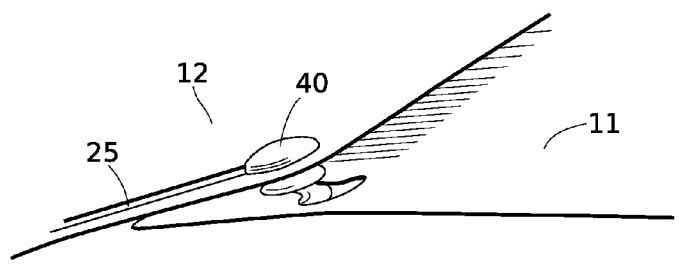
FIG. 7 is a perspective detail view showing the connection between the outer ends of a top blade and a bottom blade.

When the reflector 1 is in its retracted position the blades 10 are substantially flat and stacked on top of one another. When the reflector 1 is extended the blades together extend 360° around the hub and are elastically deformed to create a dish- or cup-shaped reflective surface. The reflective surface 8 may have an approximately parabolic shape. The transitioning of the reflector 1 is shown in FIGS. 4, 5 and 3. In FIG. 4 the reflector 1 is shown in the retracted position. The top blade 12 is moved clockwise as indicated by an arrow. FIG. 5 shows the reflector 1 in a partially extended state. The top blade 12 continues to move clockwise as shown by the arrow. As shown, the leading edge 21 of the top blade 12 slides underneath the trailing edge 20 of the bottom blade 11. Finally, FIG. 3 shows the reflector 1 in the extended state. To secure the reflector in its extended shape an outer clip 40 may be used. Referring now to FIG. 7, the outer clip 40 may be permanently connected to the top blade 12 and removably clip into an outer locking aperture 26 proximal to the outer end 23 of the leading edge 20 of the bottom blade 11. Many other methods of removably connecting the top blade 12 and the bottom blade 11 in the extended position may be used, e.g. push-buttons.

The outer clips 40 may use a double H-shaped cross-sectional shape as shown in FIG. 15. The clip thus has an upper recess 43 which is spaced apart from a lower recess 45 by a central spacer section 44. The outer clip 40 is used to connect two adjacent blades. More specifically, the outer clip 40 connects a leading slot 24 with a trailing slot 25 of the blade below. The outer clip 40 can slide within the leading slot 24 of the upper blade 10 engaging the upper recess 43 and the trailing slot 25 of the blade below engaging the lower recess 45 of the outer clip 40. The outer connections cause the blades 10 to elastically bend and form an approximately rotationally symmetrical parabolic cup when rotated into the extended position.

Alternatively or additionally a locking pin 6 may be used which engages through an inner locking aperture 37,46,47 in one or more blades when the reflector is extended. The locking pin 6 may extend inwardly into the dish and be used to hold e.g. a center disc 5. Preferably, the locking pin may use a non-round cross section so as to prevent rotation of the locking pin within the center hub and/or the center disc. The locking pin may e.g. use a hexagonal cross section. This allows use of a single locking pin to hold the center disc 5 in an eccentrically arranged receiving opening.

In addition to being connected at their outer ends 23 the blades 10 may be connected at their inner ends 22. The annular elastic arms 27, 28 may comprise circumferentially extending inner slots 46, 47 which are connected to each other by inner clips 41 with a substantially H-shaped cross section. The inner slots 46 of even number type blades 13 are overlapping with circumferentially offset inner slots 47 of odd number type blades 14, allowing adjacent blades limited rotational movement relative to each other by the coverage angle α. The inner slots 46,47 may each effectively extend 0.5*α, i.e. extend slightly further than 0.5*α to account for space occupied by the inner clips 40.

Referring now to FIG. 8, the central hub 30 may be a hub sleeve comprising an upper hub sleeve member 48 and a lower hub sleeve member 49. The bottom blade 11 has a leading annular arm 31 rigidly connected to the upper hub sleeve member 48 of the hub 30 and a trailing annular arm rigidly connected to the lower hub sleeve member 49 of the hub 30. This arrangement causes the leading edge 20 of the bottom blade 11 to slide above the trailing edge 21 of the top blade 12 when the reflector is expanded.

Figure 20:
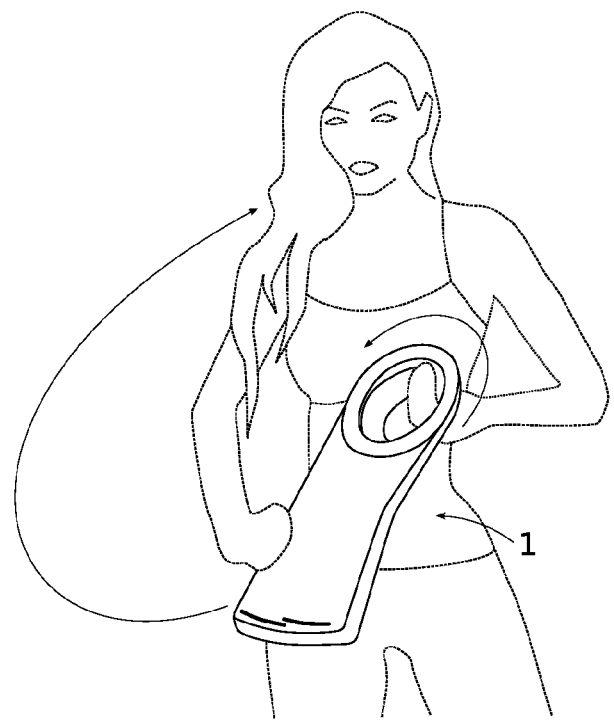
FIG. 20 is a perspective view showing the initial position of the reflector when being expanded.
Figure 21:
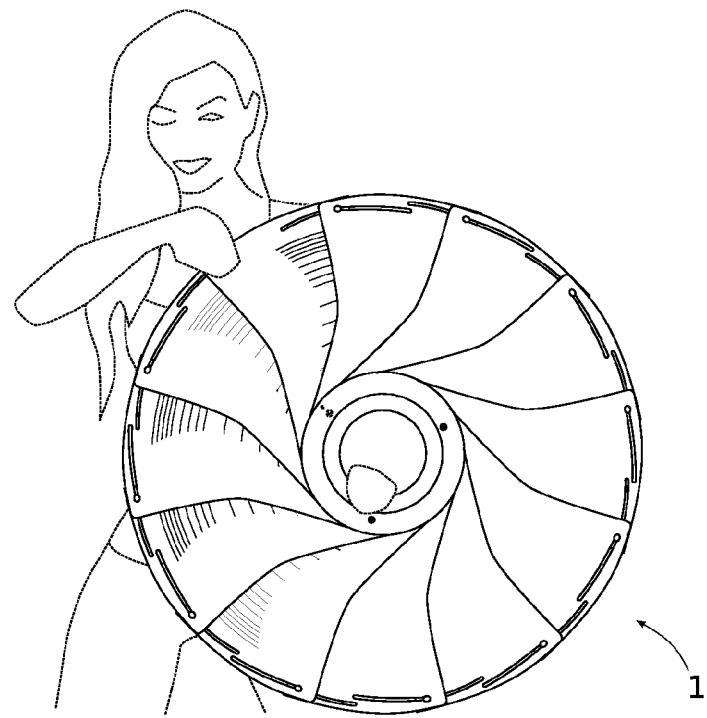
FIG. 21 is a perspective view showing the final position of the reflector when being expanded.

Referring now to FIG. 20, a method is illustrated with which a user can easily and seamlessly expand the reflector 1. The arrows in FIG. 20 indicate preferable hand and arm movement of the user. As shown, the user holds the central hub 30 of the reflector in her left hand and holds the outer end of the top blade of the reflector 1 with her right hand. The user then rotates the central hub in a counter-clockwise motion of her hand by approximately 180° while simultaneously rotating her upper arm in a clockwise motion of approximately 180° to fully open the reflector 1. Once the reflector 1 is fully opened as shown in FIG. 21 the user's right hand is automatically in the right position to attach the top blade to the bottom blade and secure the dish-shaped reflector 1 in its opened position.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A collapsible reflector, comprising
a plurality of reflective blades rotatably arranged around a common axis, each blade having a leading edge and a trailing edge,
wherein the blades are substantially flat and stacked above one another between a top blade and a bottom blade when the reflector is in a retracted position, and
wherein the blades rotate and elastically bend to form an approximately dish-shaped arrangement when in an extended position, and
wherein the leading edge of the top blade is arranged below the trailing edge of the bottom blade when the reflector is in the extended position.

2. The collapsible reflector as in claim 1, wherein adjacent blades are connected at their outer ends and wherein rotation of adjacent blades relative to each other is limited by the connection.

3. The collapsible reflector as in claim 1, wherein each blade is connected to its adjacent blade by an outer clip which engages through apertures in the adjacent blades and wherein at least one of the apertures is a slot extending near an outer end of the blade.

4. The collapsible reflector as in claim 1, wherein the leading edges and/or the trailing edges of the reflective blades are arranged on top of one another when the reflector is in the retracted position.

5. The collapsible reflector as in claim 1, wherein the reflector comprises a central axial opening when extended.

6. A light device comprising the collapsible reflector as in claim 5 and a light source which mounts to the reflector through the central axial opening.

7. The collapsible reflector as in claim 1, wherein at least two blades are identical.

8. The collapsible reflector as in claim 1, wherein an inner end of the bottom blade comprises at least one arm arranged around the common axis, and
wherein the arm of the bottom blade extends above the top blade when the reflector is in the retracted position.

9. The collapsible reflector as in claim 8, further comprising a locking pin which engages through one or more apertures in one or more blades when the reflector is extended.

10. The collapsible reflector as in claim 9, further comprising a center disc arranged at a distance from the bottom of the reflector by the locking pin.

11. The collapsible reflector as in claim 10, wherein the center disc is held by a single locking pin which engages a receiving opening in the center disc.

12. A collapsible reflector, comprising:
a central hub having a longitudinal axis; and
a plurality of elastic blades, each blade being connected at an inner end to the central hub,
wherein the reflector is collapsible from an extended position, in which the blades together extend 360° around the hub, to a retracted position, in which the blades are stacked above one another, and
wherein the inner end of at least one blade is arranged non-horizontally relative to radial planes around the longitudinal axis when the reflector is in the retracted position.

13. The collapsible reflector as in claim 12,
wherein the blades are connected to the central hub by annular elastic arms, and
wherein at least one annular elastic arm slides axially along the central hub when the reflector is extended or retracted.

14. The collapsible reflector as in claim 13, wherein the annular elastic arms are connected to form an annular ring.

15. The collapsible reflector as in claim 12, wherein the blades comprise circumferentially extending slots at the inner end and wherein adjacent blades are connected by at least one inner clip which engages overlapping slots and limits rotation of adjacent blades relative to each other.

16. The collapsible reflector as in claim 12, wherein the central hub is a hub sleeve comprising an upper hub sleeve member and a lower hub sleeve member.

17. The collapsible reflector as in claim 16, wherein the plurality of elastic blades comprises a bottom blade having a trailing annular arm rigidly connected to the upper hub sleeve member and a leading annular arm rigidly connected to the lower hub sleeve member.

18. The collapsible reflector as in claim 12, wherein each blade has a leading edge and a trailing edge, and wherein the leading edge of each blade is arranged above the trailing edge of an adjacent blade when the reflector is expanded.

19. The collapsible reflector as in claim 12, wherein the blades are substantially flat when the reflector is collapsed and wherein the blades rotate and elastically bend to form an approximately rotationally symmetrical parabolic cup when extended.

20. The collapsible reflector as in claim 12, wherein each blade has a leading edge and a trailing edge, and wherein the leading edges of the reflective blades are arranged on top of one another when the reflector is in the retracted position.

21. The collapsible reflector as in claim 12, wherein a width of the blades between a leading edge and a trailing edge is smaller in a central section of the blade than at the he inner end and at an outer end.

22. A collapsible reflector, comprising
a plurality of blades,
wherein the blades are substantially flat and stacked above one another between a top blade and a bottom blade when the reflector is in a retracted position, and
wherein the blades rotate and elastically bend to form an approximately dish-shaped arrangement when in an extended position, and
wherein the bottom blade is fixedly connected to a central hub above the top blade and the remaining blades can rotate in a limited angular range against each other around the central hub, and
wherein adjacent blades are connected at their outer ends, and
wherein the bottom blade and the top blade can be removably connected to each other at their outer ends.

* * * * *